US006124042A

United States Patent [19]

Hashimoto

[11] Patent Number: 6,124,042

[45] Date of Patent: Sep. 26, 2000

[54] LOW-HEAT-SHRINKAGE POLYESTER FILM AND HEAT-DEVELOPMENT PHOTOGRAPHIC LIGHT-SENSITIVE MATERIAL USING THE SAME

[75] Inventor: Kiyokazu Hashimoto, Minami-ashigara, Japan

[73] Assignee: Fuji Photo Film Co., Ltd., Minami-Ashigara, Japan

[21] Appl. No.: 09/244,461

[22] Filed: Feb. 4, 1999

[30] Foreign Application Priority Data

Feb. 6, 1998 [JP] Japan .................................. 10-039787

[51] Int. Cl.[7] .............................. B32B 27/36; G03C 1/09; G03C 1/76; G03C 1/795; G03C 7/26

[52] U.S. Cl. .......................... 428/480; 430/523; 430/531; 430/533; 430/541; 430/542; 430/564; 430/617; 430/618; 430/620

[58] Field of Search ............................ 428/480; 430/523, 430/531, 533, 541, 542, 564, 617, 618, 620

[56] References Cited

FOREIGN PATENT DOCUMENTS 3-97523 4/1991 Japan .

*Primary Examiner*—Vivian Chen

*Attorney, Agent, or Firm*—Burns, Doane, Swecker & Mathis, LLP

[57] ABSTRACT

A polyester film which has the in-plane rate of dimensional change of more than 0.02%, but not more than 0.05%, when the film is kept for 72 hours under the conditions of temperature 60° C. and relative humidity 80%, and the average value of the in-plane rate of dimensional change of from −0.07% to 0.03% and the in-plane anisotropy of the in-plane rate of dimensional change of from 0% to 0.08%, when the film is kept for 30 minutes at a temperature of 105° C. This polyester film is low in heat shrinkage and excellent in thermal dimensional stability. A heat-development, photographic light-sensitive material using the polyester film is low in heat shrinkage and excellent in thermal dimensional stability.

19 Claims, No Drawings

LOW-HEAT-SHRINKAGE POLYESTER FILM AND HEAT-DEVELOPMENT PHOTOGRAPHIC LIGHT-SENSITIVE MATERIAL USING THE SAME

FIELD OF THE INVENTION

The present invention relates to a low-heat-shrinkage polyester film. The present invention also relates to a heat-development photographic light-sensitive material using the polyester film.

BACKGROUND OF THE INVENTION

Hitherto, for a silver halide photographic light-sensitive material, a wet development has been applied using a developing solution after photographing. However, the method has the following inconveniences, and improvement has been desired.

[1] Because development, bleaching, fixing, and drying are carried out, a long time is required for the development processing.

[2] Because plural tanks containing a developing solution are required, a processor cannot be made small in size and light in weight.

[3] Inconveniences, such as the replenishment of a developing solution, the disposal of processing liquids, washing of developing tanks, etc., are required.

For improvement thereof, photographic light-sensitive materials that are processed using a development method by heating (hereinafter, occasionally referred to as "heat development") to a temperature of from 80 to 150° C. are proposed. One example is a method of previously incorporating a precursor for a developing agent in a light-sensitive layer, decomposing the precursor by heating, to form a developing agent, and subjecting to development. In such a heat-development system, the development processing may be carried out by only applying heat, whereby the processing can be carried out in a short time and a processor can be small in size. Furthermore, there are no inconveniences with the replenishment and the disposal of a developing solution.

However, when the light-sensitive material of this system was applied to a printing light-sensitive material, when 4 plates (blue, green, red, and black plates) were piled up, there was a problem that color discrepancy and distortion of an image were caused by the dimensional change that occurred during heat development. In order to solve this problem, there is proposed a method in which use is made of a support having isotropic characteristics and a minimum heat shrinkage, as described in JP-A-3-97523 ("JP-A" as herein used means an unexamined published Japanese patent application). However, the support obtained in accordance with the above-mentioned patent was insufficient for dimensional stability, when subjected to heat development at 80° C. to 150° C. Further, heat fixation is conducted with extension at the time of film formation, in order to decrease in-plane anisotropy accompanied by bowing phenomenon. However, strain (distortion) at the time of film formation was insufficiently relieved by this method, such that the method was unsatisfactory for a photographic support that was required to have high dimensional stability and high flatness within a larger area (0.6 m×1 m). Further, this support is subjected to heat treatment with heating while floating the same at 140° C. for 1 to 5 seconds (tension 5 kg/cm$^2$). However, the dimensional stability on this condition, particularly at a high temperature and short time of 105° C. and 30 minutes, was not only insufficient but also the occurrence of dimples (concavities), due to fluttering or flapping of the support caused by the floating system, was so remarkable that the flatness was insufficient.

SUMMARY OF THE INVENTION

An object of the present invention is to provide a low-heat-shrinkage polyester film having excellent thermal dimensional stability. Another object of the present invention is to provide a low-heat-shrinkage heat-development photographic light-sensitive material having excellent thermal dimensional stability.

Other and further objects, features, and advantages of the invention will appear more fully from the following description.

DETAILED DESCRIPTION OF THE INVENTION

The above-mentioned objects have been accomplished by the following inventions.

(1) A polyester film, which has the in-plane rate of dimensional change of more than 0.02%, but not more than 0.05%, when the film is kept for 72 hours under the conditions of temperature 60° C. and relative humidity 80%, and the average value of the in-plane rate of dimensional change of from −0.07% to 0.03% and the in-plane anisotropy of the in-plane rate of dimensional change of from 0% to 0.08%, when the film is kept for 30 minutes at a temperature of 105° C.

(2) The polyester film as stated in the above (1), wherein, when the film is kept for 72 hours under the conditions of temperature 60° C. and relative humidity 80%, the in-plane anisotropy of the in-plane rate of dimensional change is from 0% to 0.04%.

(3) The polyester film as stated in the above (1) or (2), wherein, with respect to the whole region in the base transverse (width-wise) direction, when the film is kept for 72 hours under the conditions of temperature 60° C. and relative humidity 80%, the in-plane rate of dimensional change is more than 0.02%, but not more than 0.05% and the in-plane anisotropy of the in-plane rate of dimensional change is from 0% to 0.04%, and, with respect to the whole region in the base transverse direction, when the film is kept for 30 minutes at a temperature of 105° C., the average value of the in-plane rate of dimensional change is from −0.07% to 0.03% and the in-plane anisotropy of the in-plane rate of dimensional change is from 0% to 0.08%.

(4) An anisotropic polyester film, which has the in-plane rate of dimensional change of more than 0.02%, but not more than 0.05% and the in-plane anisotropy of the in-plane rate of dimensional change of from 0.005% to 0.04%, when the film is kept for 72 hours under the conditions of temperature 60° C. and relative humidity 80%, and the average value of the in-plane rate of dimensional change of from −0.07% to 0.03% and the in-plane anisotropy of the in-plane rate of dimensional change of from 0.01% to 0.08%, when the film is kept for 30 minutes at a temperature of 105° C.

(5) The anisotropic polyester film as stated in the above (4), wherein, with respect to the whole region in the base transverse direction, when the film is kept for 72 hours under the conditions of temperature 60° C. and relative humidity 80%, the in-plane rate of dimensional change is more than 0.02%, but not more than 0.05% and the in-plane anisotropy of the in-plane rate of dimensional change is from 0.005% to 0.04%, and, with respect to the whole region in the base transverse direction, when the film is kept for 30 minutes at a temperature of 105° C., the average value of the in-plane rate of dimensional change is from −0.07% to 0.03% and the in-plane anisotropy of the in-plate rate of dimensional change is from 0.010% to 0.08%.

(6) The polyester film as stated in any one of the above (1) to (5), wherein the polyester film is a polyethylene terephthalate film or a polyethylene naphthalate film.

(7) A heat-development photographic light-sensitive material, having a support which comprises the polyester film stated in any one of the above (1) to (6).

Herein, the heat-development referred to in the present invention is a manner of development, wherein, after exposure to light to form a latent image, development is carried out only by heat, instead of a processing with a developing solution conventionally used for a silver halide light-sensitive material. The heat in the heat-development is one at preferably 80° C. or higher but 160° C. or lower, more preferably 100° C. or higher but 150° C. or lower, and further preferably 105° C. or higher but 135° C. or lower. The heat-development time is preferably 20 sec or more but 3 min or less, more preferably 25 sec or more but 2 min or less, and further preferably 30 sec or more but 1 min or less.

A low-heat-shrinkage polyester film of the present invention has the following properties: when the film is kept for 72 hours under the conditions of temperature 60° C. and relative humidity 80%, the in-plane rate of dimensional change is more than 0.02%, but not more than 0.05%, preferably more than 0.02%, but not more than 0.04%, and, when the film is kept for 30 minutes at a temperature of 105° C., the average value of the in-plane rate of dimensional change is from −0.07% to 0.03%, preferably from −0.06% to 0.02%, and more preferably from −0.05% to 0.02% (a positive number of the in-plane rate of dimensional change indicates extension, while a negative number indicates shrinkage).

The dimensional change between before and after the heat development of a coated photographic light-sensitive layer (i.e. a photographic light-sensitive material) was unexpectedly minimized by employing a polyester support within the scope of the present invention. If the in-plane rate of dimensional change, when the film is kept for 72 hours under the conditions of temperature 60° C. and relative humidity 80%, exceeds the range defined in the present invention, or if it is below the range, the dimensional change that occurs at the time of heat development is undesirably remarkable. Consequently, outside of the present invention is disadvantageous, in that color discrepancy in lap printing occur.

This mechanism has not been made clear, but the following presumption can be provided.

That is, water is adhered (absorbed) to the photographic light-sensitive layer, and when the layer is subjected to heat-development, water diffuses into a polyester support. It is presumed that this is because the light-sensitive layer contacts a heat source, and therefore water cannot volatilize from the surface of light-sensitive layer, and consequently it diffuses into a polyester support located on the side opposite to the heat source. Accordingly, this result indicates that the polyester support has been subjected to heat treatment under high humidity. On the other hand, the light-sensitive layer dehydrates, and a shrinkage stress is applied to the light-sensitive layer. Therefore, if a dimensional change due to heat treatment under high humidity is an extension within the range of the present invention, such an extension and the shrinkage of the light-sensitive layer can offset each other, which results in a minimized dimensional change. On the other hand, if the polyester support has dimensional properties exceeding the range of the present invention, and its extension at a high humidity is too large, the photographic light-sensitive material excessively extends. This result is not preferable. In contrast, if the polyester support has dimensional properties below the range of the present invention, the contribution to the shrinkage of the light-sensitive layer becomes large, so that the photographic light-sensitive material excessively shrinks. This result is not preferable. Thus, it is presumed that the present invention provides phenomena peculiar to the support for a photographic light-sensitive material.

Further, when the polyester support is kept for 72 hours under the conditions of temperature 60° C. and relative humidity 80%, the in-plane anisotropy of the in-plane rate of dimensional change is generally from 0% to 0.04%, preferably from 0.005% to 0.04%, and more preferably from 0.005% to 0.03%. Further, when the polyester support is kept for 30 minutes at a temperature of 105° C., the in-plane anisotropy of the in-plane rate of dimensional change is generally from 0% to 0.08%, preferably from 0.01 to 0.08%, and more preferably from 0.01% to 0.06%. As described above, more preferably, the polyester support film is anisotropic rather than completely isotropic (the in-plane anisotropy=0). Further, it is more preferred to increase the absolute dimensional change amount (the absolute value of the shrinkage amount or the extension amount) in the TD direction rather than in the MD direction. The flatness defect (undulation, edge extension (wavy edges), dimples, etc.) that occurs upon heat development can be decreased by this method. Presumably, this results from the difference between stress applied to the MD direction and that to the TD direction in a heat-developing apparatus (a conveyance tension is applied to the MD direction, but not to the TD direction). However, its detail has not been made clear.

Further, preferably, with respective to the whole region in the base transverse direction, when the polyester support is kept for 72 hours under the conditions of temperature 60° C. and relative humidity 80%, the in-plane rate of dimensional change is generally more than 0.02%, but not more than 0.05%, more preferably more than 0.02%, but not more than 0.04%, and the in-plane anisotropy of the in-plane rate of dimensional change is generally from 0% to 0.04%, more preferably from 0.005% to 0.04%, and further preferably from 0.005% to 0.03%. In addition, it is preferred that, with respect to the whole region in the base transverse direction, when the polyester support is kept for 30 minutes at a temperature of 105° C., the average value of the in-plane rate of dimensional change is generally from −0.07% to 0.03%, more preferably from −0.06% to 0.02%, and further preferably from −0.05% to 0.02%, and the in-plane anisotropy of the in-plane rate of dimensional change is generally from 0% to 0.08%, more preferably from 0.01% to 0.08%, and further preferably from 0.01% to 0.06%.

When the polyester support is kept for 72 hours under the conditions of temperature 60° C. and relative humidity 80%, if the in-plane rate of dimensional change exceeds the above range defined in the present invention, the dimensional change caused by heat development of the coated light-sensitive layer tends to become large. This tendency is not preferable. On the other hand, even if the in-plane rate of dimensional change is below the range defined in the present invention, the dimensional change caused by heat development of the coated light-sensitive layer also tends to become large, and in addition, undulation, edge extension, and dimples occur in the light-sensitive material after heat development, so that the flatness is easily lowered, which is not desired.

Further, when the polyester support is kept for 30 minutes at a temperature of 105° C., if the average value of the in-plane rate of dimensional change exceeds the range defined in the present invention, the dimensional change caused by heat development of the coated light-sensitive layer unpreferably tends to become large. On the other hand, if the average value of the in-plane rate of dimensional change is below the range defined in the present invention, the dimensional change caused by heat development of the coated light-sensitive layer also unpreferably tends to become large.

When the polyester support is kept for 72 hours under the conditions of temperature 60° C. and relative humidity 80%, whether the in-plane anisotropy of the in-plane rate of dimensional change is above or below the above range defined in the present invention, undulation, edge extension, and dimples occur in the light-sensitive material after heat development, so that the flatness unpreferably tends to become low. When the polyester support is kept for 30 minutes at a temperature of 105° C., whether the in-plane anisotropy of the in-plane rate of dimensional change is above or below the range defined in the present invention, undulation, edge extension, and dimples occur in the heat-developed light-sensitive material. Eventually the flatness unpreferably tends to become low.

Preferably, the characteristics of the present invention as described above are accomplished over the whole range in the base transverse direction, eventually leading to the absence of image shear (discrepancy) over the whole range in a photographic light-sensitive material for printing by which a large-size (not less than 60 cm) material is usually handled. Further, because it is not necessary to cut off a portion having a high rate of dimensional change, the obtaining rate very preferably increases. A preferable base width is from 0.6 m to 10 m, more preferably from 1 m to 8 m, and further preferably from 1.2 m to 6.5 m.

Thus, extremely high dimensional stability is required for a polyester support used for a photographic light-sensitive material, so that such a particular rate of dimensional change, and its anisotropy and distribution in the transverse direction, are needed. If the characteristics of a polyester support exceeds the range defined in the present invention, unpreferably the flatness is lowered due to heat development, or alternatively strain occurs in an image. Particularly, with respect to a photographic light-sensitive material for printing that is required to have a high lapping accuracy, the particular rate of dimensional change, and its anisotropy and distribution in the transverse direction, are needed.

These low-heat-shrinkage polyester supports can be obtained by the following methods.

The polyester that forms a low-heat-shrinkage polyester support is produced by a dicarboxylic acid and a diol. Preferable examples of the dicarboxylic acid include terephthalic acid, naphtharenedicarboxylic acid, isophthalic acid, orthophthalic acid, paraphenylenedicarboxylic acid, and esters thereof. Preferable examples of the diol include ethylene glycol, butylene glycol, cyclohexane dimethanol, neopentyl glycol, bisphenol A, and biphenol. In addition to the diol and the dicarboxylic acid, a hydroxycarboxylic acid can also be used to form a polyester, and parahydroxybenzoic acid and 6-hydroxy-2-naphthalenecarboxylic acid may be used.

Preferred, of these polyesters, are those whose content of terephthalic acid or naphthalenedicarboxylic acid in the total dicarboxylic acid unit is from 50 mol % to 100 mol %. These polyesters may be a copolymer or a polymer blend. Of these polyesters, polyethylene terephthalate (PET) and polyethylene naphthalate (PEN) are particularly preferred.

These polyesters can be obtained by reacting a dicarboxylic acid and a dialcohol which are raw materials, under a pressure of from 1 to 2 kg/mm$^2$, or an atmosphere, at a temperature of 180° C. to 280° C., for 0.5 to 8 hours, to complete transesterification, and then heating the mixture under a vacuum of 50 to 1 mmHg, at a temperature of 240 to 290° C., for 1 to 3 hours, to polymerize. At this time, preferably raw materials are added as a form of slurry. Specifically, a dicarboxylic acid, or its diester, and terephthalic acid are finely grained, and then these fine grains are dispersed into ethylene glycol, to supply as a slurry. At this time of polymerization, if necessary, a transesterification catalyst or a polymerization catalyst may be used, or a high-temperature-stabilizing agent (e.g. phosphorous acid, phosphoric acid, trimethylphosphate, triethylphosphate, tetraethyl ammonium) may be added thereto. Synthesis of these polyesters can be conducted in reference, for example, to *Kobunshi Jikkengaku* (High-molecular Experimentologies), Vol. 5 "Polycondensation and polyaddition" (Kyoritsu Shuppan, 1980), pp. 103–136; "Synthetic high molecule V" (Asakura Shoten, 1971), pp.187–286; JP-A-5-163337, JP-A-3-179052, JP-A-2-3420, JP-A-1-275628, JP-A-62-290722, and JP-A-61-241316.

It is preferred, from a viewpoint of heat-resistance property, that these polyesters have a glass transition temperature (Tg) of not less than 50° C., more preferably not less than 60° C., and further preferably not less than 65° C.

Preferred, of the polymers thus-polymerized, are those whose limiting viscosity measured at 35° C. in an orthochlorophenol solvent is from 0.4 to 0.9, and more preferably from 0.45 to 0.70.

The polyester film according to the present invention can be given a sliding property. For this purpose, addition and kneading of an inactive inorganic compound into the polyester film is used as a general method. Examples of these inactive inorganic particles include $SiO_2$, $TiO_2$, $BaSO_4$, $CaCO_3$, talc, and kaolin. These compounds can be used in a method for imparting a sliding property that comprises using external (outside) particles, in which inactive particles are added to a polyester synthesis reaction system. Alternatively, they can be used in another method for imparting a sliding property that comprises using internal particles, in which catalysts and the like that are added at the time of polymerization reaction of a polyester, are allowed to deposit. A preferable amount of the inactive inorganic compound to be added is from 5 ppm to 1000 ppm, and more preferably from 10 ppm to 500 ppm. A preferable size of the particles to be added is from 0.01 $\mu$m to 10 $\mu$m, and more preferably from 0.05 $\mu$m to 5 $\mu$m.

A film formation method of these polyester supports of the present invention is described below.

The polymer polymerized by the above-mentioned method is pelletized, and the pellets are dried at a temperature of 80° C. to 200° C. for at least 1 hour. After that, they are fused, at not less than the melting point temperature (Tm) of the polymer, but not more than 330° C. After that, preferably a fused polymer has been previously filtrated using a filter. Examples of the filter include a wire gauze, a sintering wire gauze, a sintering metal, a sand, and a glass fiber. The fused polymer is extruded from a T-dye, to produce an unstretched film. The fused polymer thus extruded from the T-dye is extruded onto a casting drum that has been set at generally (Tg-80° C.) to Tg (Tg: glass transition temperature of the polyester), and preferably from (Tg-60° C.) to (Tg-10° C.). At this time, preferably, adherence of the melt with a drum is improved by an electrostatic impression method, or a liquid membrane-forming method (a liquid, such as water, is coated on a casting drum, in order to improve the adherence of the melt with a drum), to thereby improve flatness.

The thus-obtained unstretched film is successively subject to biaxial stretching, thermal fixation, and heat relaxation, to produce a finished film. The present invention is advantageous in that strain that occurs during a step of stretching can be minimized. Preferably, a relaxation step is added after each of lengthwise stretching, horizontal stretching, and heat fixing, respectively, as described below. Hereinbelow, a preferable production method is described.

[1] Relaxation after lengthwise stretching: First, the unstretched film formed by the above-described method is stretched 2.8 to 3.8 times in the lengthwise direction, (MD) at a temperature of (Tg+15° C.) to (Tg+50° C.). The lengthwise stretching can be accomplished by accelerating the outlet roller speed faster than the inlet roller speed. After that, the stretched film is subjected to heat treatment at a lengthwise stretching temperature of (Tmd) to (Tmd+50° C.), more preferably from (Tmd+10° C.) to (Tmd+40° C.), at a tension in the lengthwise direction of not more than 100 $g/mm^2$, more preferably not more than 50 $g/mm^2$, and not more than 30 $g/mm^2$, to thereby relax the strain of stretching, eventually leading to the minimized MD dimensional change.

[2] Relaxation after horizontal stretching: The film is stretched at a temperature of (Tg+20° C.) to (Tg+55° C.) 3.0 to 4.0 times in the horizontal direction. After that, the stretched film is relaxed at a temperature of (Tg+60° C.) to (Tg+100° C.) in the horizontal direction. At this time, relaxation of 3 to 10% is applied to the horizontal direction, whereby the strain of the horizontal stretching can be relaxed, and the TD dimensional change is minimized.

[3] Relaxation after thermal fixation: Thermal fixation is performed at a temperature of (Tm−50° C.) to (Tm−10° C.). At this time, preferably relaxation of 3 to 10% is applied to the horizontal (transverse) direction, to thereby relax the strain in the horizontal direction caused by a shrinkage stress due to the thermal fixation, and to thereby minimize the TD dimensional change. More preferably, the temperature of both edges of a thermal fixation zone is higher than the central portion thereof by 2 to 10° C. The bowing of the edge portions that are fixed with chucks, and therefore tend to cause strain, can be further minimized by the above-mentioned method.

[4] Low-tension winding: After thermal fixation, the film is conveyed at a tension of not more than 100 $g/mm^2$, more preferably not more than 50 $g/mm^2$, and further preferably 30 $g/mm^2$; thereby the strain due to a shrinkage stress in the lengthwise direction that occurred during the thermal fixation is dissolved, which results in a minimized dimensional change, with the proviso that the term "tension" herein used means a value before the film is cooled to Tg or lower.

[5] Trimming at Tg or higher: It is further effective, for relaxation of the strain in the horizontal direction, to previously trim the edge portions that had been fixed with chucks before the film is cooled to Tg or lower. This is done in order to relax a shrinkage stress caused by cooling.

The above-mentioned relaxation after the horizontal stretching and the thermal fixation, is also effective for minimizing the dimensional change all over the range in the base transverse direction. These relaxations significantly relieve the stress in the proximity of chucks, where shrinkage stress tends to become large, and therefore the rate of dimensional change is minimized all over the width of a polyester support film. This effect becomes more remarkable when relaxation is combined with a low-tension heat-treatment to be conducted after these steps.

Preferable heat treatment is carried out at a temperature of from 150° C. to 180° C., and preferable the heat treatment time is from 30 sec. to 120 sec., and more preferably from 40 sec. to 90 sec. The heat treatment time is particularly important. That is, if the heat treatment time is shorter than the above-mentioned specific period of time, unpreferably the dimensional change at a high temperature for a short time (105° C., 30 minutes) tends to become large, and in addition the distribution in the base transverse direction tends to become large. On the other hand, if the heat treatment time is longer than the specific period of time, unpreferably oligomers drastically deposit, so that haze tends to become worse. Such heat control may be accomplished by blowing hot air into a heat treatment zone in which a heat-insulating material is used. Alternatively, a plastic film may be contacted with a high-temperature heat medium, such as a heat roll, to raise the temperature by heat transfer, or the temperature may be raised by radiation heat employing an infrared ray heater or the like. In any of these heat-controlling methods, reduction of the temperature distribution in the transverse direction is preferred to minimize the heat shrinkage distribution in the transverse direction. This can be accomplished by setting a fin at the hot air nozzle to regulate the direction of hot air, thereby restricting the drift of the air, or alternatively by separately controlling a heat roll or an infrared ray heater, so that the temperature of both end portions, which tends to become lower, can be increased.

Further, the tension of this heat treatment is preferably from 0.5 $kg/cm^2$ to 3.5 $kg/cm^2$, and more preferably from 1 $kg/cm^2$ to 2.5 $kg/cm^2$. If the tension is below the above-mentioned range, the base easily moves in a zigzag manner during its conveyance. On the other hand, if the tension exceeds the range, the dimensional change at a high temperature and for a short time (105° C., 30 min.) tends to become larger. Such control of the tension can be accomplished by regulating a motor that is set at at least one of the side of the winder and the side of delivery (sending out). At this time, it is preferred that a tension pickup is set, and the tension is regulated while monitoring it. However, if a film is wound at such a low tension, the roll easily gets out of shape, and therefore the film is preferably rolled at a high tension subsequent to a tension-cut performed just before this side of the rolling section.

Whether such a heat treatment is carried out in a single heat treatment zone, or in a multiple heat treatment zones, similar effects are obtained. Such a base conveyance may be carried out by moving the base between pass rolls, or by vertically moving the base in a heat treatment zone.

Further, in order to retain high flatness, preferably a preheating zone is set at an inlet of the heat treatment zone, and an annealing (gradually cooling) zone is set at an outlet thereof. In both zones, preferably a treatment is carried out at a temperature of from Tg to the heat treatment temperature, for 3 sec. to 120 sec. This treatment restrains the base from a galvanized iron sheet-like (wavy) deformation caused when a support is stretched or shrunk on a large scale by a drastic temperature fluctuation, and thereby a high flatness can be maintained.

Such a heat treatment may be carried out after the film formation for a support, or after the coating of a subbing layer and/or a backing layer. The latter is preferable.

A photographic light-sensitive material is produced using the thus-obtained support, by coating a light-sensitive layer (s) and a backing layer(s). The support is, first, preferably subjected to surface treatment, in order to achieve strong adhesion between the support and these layers. As the above-mentioned surface treatment, it is preferable to conduct, such as a glow discharge treatment (JP-A-8-194286, etc.), a corona treatment (e.g., JP-B-48-5043 ("JP-B" means an examined Japanese patent publication), JP-B-47-51905, JP-A-47-28067, JP-A-49-83767, JP-A-51-41770, and JP-A-51-131576), an ultraviolet ray treatment (e.g., JP-B-43-2603, JP-B-43-2604, and JP-B-45-3828), and a flame treatment.

It is preferable to provide a subbing layer(s) (undercoat layer(s)) between the support subjected to surface treatment and a light-sensitive layer(s) and/or a backing layer(s). For the subbing layer, the following coating methods are available: a so-called multilayer method, in which a layer that is able to adhere well to a support is coated on the support, as the first layer (hereinafter referred to as the first subbing layer), and a layer that is able to adhere well to both the photographic constituting layer and the first subbing layer, as the second layer (hereinafter referred to as the second subbing layer), is further coated on the first subbing layer; and a single layer method, in which a single layer that is able to adhere well to both a support and a photographic layer is coated.

In the first subbing layer according to the multilayer method, the following polymers can be used: for example, copolymers produced by using monomers selected from vinyl chloride, vinylidene chloride, butadiene, vinyl acetate, styrene, acrylonitrile, methacrylate ester, methacrylic acid, acrylic acid, itaconic acid, maleic anhydride, and the like, as a starting material; and other polymers, such as epoxy resins, gelatin, nitrocellulose, and polyvinyl acetate. Further, if necessary, crosslinking agents, such as a triazine-series, epoxy-series, melamine-series, isocyanate-series (containing blockisocyanate), aziridine-series, and oxazaline-series; inorganic grains, such as colloidal silica, surface active agents, thickening agents, dyes, and antiseptic agents, can be added. Further, use can be made of gelatin as a main polymer for the second subbing layer.

On the other hand, in the single layer method, a method in which good adhesion can be achieved by swelling a support, followed by an interfacial mixing of the swollen support with a hydrophilic subbing polymer, is often used. Examples of the subbing polymers that can be used, include a water-soluble polymer, such as gelatin, gelatin derivatives, casein, agar-agar, sodium alginate, starch, polyvinyl alcohol, a polyacrlylic acid-based copolymer, and a maleic anhydride-based copolymer; a cellulose ester, such as carboxymethyl cellulose and hydroxyethyl cellulose; and a latex polymer, such as a vinyl chloride-containing copolymer, a vinylidene chloride-containing copolymer, an acrylic acid ester-containing copolymer, and a vinyl acetate-containing copolymer, with gelatin preferred. As the gelatin, use can be made of any of gelatins usually used in the art, such as so-called lime-processed gelatin, acid-processed gelatin, or enzyme-processed gelatin, gelatin derivatives and modified gelatins. Among these gelatins, lime-processed gelatin, and acid-processed gelatin are most preferable to be used.

A backing layer(s) is coated for imparting, for example, scratch-resistance, a sliding property, curl compensation, and an anti-static capability for a backing surface. In the backing layer, a hydrophilic colloid or a hydrophobic polymer may be used as a binder.

Gelatin is the most preferable hydrophilic colloid. When a hydrophilic polymer is used, preferably a backing layer is coated on the same subbing layer as that of a light-sensitive layer, in order to give thereto a firmer adhesion.

Examples of a binder for use in the hydrophobic polymer layer include (meth)acrylic acid ester-based polymers, such as polymethyl methacrylate and polyethyl acrylate; olefin-series polymers, such as polyethylene; stylene-series polymers, poly(vinylidene chloride), urethane-series polymers; and rubber-series polymers, such as butadiene. The hydrophobic polymer layer may be a single layer or multiple layers.

If necessary, a matting agent, a sliding agent, an electrification-regulating (autistatic-regulating) agent, a surface-active agent, and a crosslinking agent may be added to the backing layer and/or the subbing layer.

As an electrification-regulating agent, electrically conductive fine grains of crystalline metal oxides or composite oxides thereof are preferably added, to make a surface resistivity of $10^{12}$ Ωcm or less. These electrically conductive fine grains of crystalline metal oxides or their composite oxides, preferably have a volume resistivity of $10^7$ Ωcm or less, more preferably $10^5$ Ωcm or less. Further, their grain size is preferably from 0.01 to 0.7 μm, and particularly preferably from 0.02 to 0.5 μm.

A method of producing these electrically conductive fine grains of crystalline metal oxides or composite oxides is fully described in a specification of JP-A-56-143430.

For example, the first method, in which metal oxide fine grains are produced by burning, and then they are subjected to a heat treatment in the presence of a hetero atom that gives improved electrical conductivity; the second method, in which a hetero atom, for improving electrical conductivity, is coexisted when metal oxide fine grains are produced by burning; and the third method, in which an oxygen defect is formed by reducing the oxygen density in the atmosphere, when metal fine grains are produced by burning; and the like, are easily carried out.

Examples of composite oxides containing metal atoms include $Z_nO$ containing Al, In, or the like; $TiO_2$ containing Nb, Ta, or the like; and $SnO_2$ containing Sb, Nb, halogen elements, or the like. The amount of hetero atoms to be added is preferably from 0.01 to 30 mol %, and particularly preferably from 0.1 to 10 mol %. $SnO_2$ composite metal oxide fine grains to which Sb is added, are most preferred of these grains.

Further, a dyed light-insensitive hydrophilic colloid layer (hereinafter referred to as a dyed layer) may be applied for purposes of antihalation, improvement of safelight safety, and improvement of the distinguishing property of the front and back sides. The above technique is described in detail in the patents described below. That is, there are a method of absorbing a dye on a mordant, as described in, for example, U.S. Pat. Nos. 3,455,693, 2,548,564, 4,124,386, and 3,625,694, JP-A-47-13935, JP-A-55-33172, JP-A-56-36414, JP-A-57-161853, JP-A-52-29727, JP-A-61-198148, JP-A-61-177447, JP-A-61-217039, and JP-A-61-219039; a method of using a non-diffusion-type dye, as described in, for example, JP-A-61-213839, JP-A-63-208846, JP-A-63-296039, and JP-A-1-158439; a method of emulsifying and dispersing a dye dissolved in an oil in the form of oil droplets, as described in Japanese patent application No. 1-142688; a method of absorbing a dye on the surface of an inorganic material, as described in, for example, U.S. Pat. Nos. 2,719,088, 2,498,841, and 2,496,843, JP-A-60-45237, and Japanese patent application No. 1-139691; a method of absorbing a dye on a polymer, as described in Japanese patent application No. 1-119851; and a method of using a water-insoluble solid dye, as described in, for example, JP-A-56-12639, JP-A-55-155350, JP-A-55-155351, JP-A-63-27838, JP-A-63-197943, European patent Nos. 15,601, 274,723, 276,566, and 299,435, World patent (WO) 88/04794, and Japanese patent application No. 1-87367. Of these, the method in which a solid dye is dispersed as it is, is preferred, because the dye can be fixed in a particular layer.

Such a backing layer may be a single layer or a multilayer. The thickness of each layer is preferably from 0.02 to 10 μm, and more preferably from 0.1 to 7 μm. The total thickness of these layers is preferably from 0 to 5 μm.

These backing layers and subbing layers can be coated on a support by any one of generally well-known methods, such as a dip coating, an air-knife coating, a curtain coating, a roller coating, a wirebar coating, a gravure coating, and an extrusion coating using a hopper, as described in the specification of U.S. Pat. No. 2,681,294. Further, if necessary, multilayers can be simultaneously coated by a method as described, for example, in the specifications of U.S. Pat. No. 2,761,791, U.S. Pat. No. 3,508,947, U.S. Pat. No. 2,941,898, and U.S. Pat. No. 3,526,528, and in Yuji Harasaki, "Coating Technology (Coating Kogaku)", p. 253 (published by Asakura Shoten, 1973).

A photographic light-sensitive material of the present invention can be prepared by coating a photographic light-sensitive layer(s) on the thus-obtained support. Preferably, photographic light-sensitive materials as described in, for example, Japanese patent application No. 226699/1997 and JP-A-10-10676 (Japanese patent application No. 8-158652) can be used.

A light-sensitive layer is formed by adding a silver halide, a silver salt of an organic acid, and the like to a binder.

Examples of the binder include a latex of a styrene/butadiene/acrylonitricle copolymer (SBR), a vinylidene chloride (PVdC)-series copolymer, a polyacrylate-series polymer, a vinyl acetate resin, a polyurethane resin, a polyolefin resin, or a polymethacrylate-series polymer. The molecular weight (Mw) of these polymers or resins is preferably from 5,000 to 1,000,000, and more preferably from 10,000 to 200,000. More specifically, examples of the acrylic resins include Sevian A-4635, 46583, and 4601 (trade names, manufactured by Daicellu Chemical Industries, Ltd.), and Nipol Lx811, 814, 824, 820, and 857 (trade names, manufactured by Nippon Zeon Co., Ltd.). Examples of the rubber-series resins include LACSTAR 7310K, 3307B, 4700H, and 7132C (trade names, manufactured by Dainippon Ink & Chemicals Incorporated), and Nipol Lx416, 410, 438c, and 2507 (trade names, manufactured by Nippon Zeon Co., Ltd.). Examples of the vinylidene chloride resins and the olefin resins include L502 and L513 (trade names, manufactured by Asahi Chemical Industry Co., Ltd.), and Chemipearl S120 and SA100 (trade names, manufactured by Mitsui Chemicals, Inc.), respectively. These resins may be used singly or in combination thereof. The density of the solid content in these latexes is preferably from 10% to 80%, and more preferably from 20% to 70%.

Further, it is also preferred that a water-soluble polymer is used, such as a water-soluble polyester (for example, PET copolymerized with slufo-isophthalic acid), poly(vinyl pyrrolidone), starch, gum-arabic, poly(vinyl alcohol), polyacrylic acid, polymethacrylic acid, chitin, and chitosan. The molecular weight (Mw) of these polymers is preferably from 5,000 to 1,000,000, and more preferably from 10,000 to 200,000. These may be used singly or in combination thereof.

Further, a silver salt of an organic acid is preferably added to a light-sensitive layer. A preferable organic acid of the silver salt is an aliphatic carboxylic acid having 10 to 30 carbon atoms. More preferable examples of the silver salt include silver behenate, silver arachidate, silver stearate, silver oleate, silver laurate, silver hexanoate (caproate), silver myristate, silver pulmitate, silver maleate, silver fumalate, silver linolate, silver butyrate, and silver oxalate. Among these silver salts, silver behenate is preferred.

These silver salts of organic acids are preferably dispersed and coated. It is also preferred to use a polymer, such as a polyacrylic acid, an acrylic acid copolymer, a maleic acid copolymer, an acryloylmethylpropanesulfonic acid copolymer, a carboxymethyl cellulose, and a carboxymethyl starch; anionic surfactants as described in JP-A-52-92716 and W088/047974; and known anionic, nonionic, and cationic surfactants.

A light-sensitive silver halide is used in a light-sensitive layer. For example, those as described in Research Disclosure (June 1978) No. 17029 and U.S. Pat. No. 3,700,458, can be used. The silver halide is preferably used in an amount of 0.01 to 0.5 mol per mol of the silver salt of an organic acid. If necessary, it is preferred to incorporate therein at least one of complexes of the metal selected from a group consisting of rhodium, rhenium, ruthenium, osmium, iridium, cobalt, mercury, and iron, in an amount of 1 n mol to 10 m mol, per mol of silver. Further, a sulfur sensitization, a selenium sensitization, or a tellurium sensitization can also be used.

Further, a nucleating agent is preferably added thereto. Examples of the nucleating agent include amine derivatives, onium salts, disulfide derivatives, hydroxymethyl derivatives, hydroxame derivatives, acylhydrazide derivatives, acrylonitrile derivatives, and a hydrogen donor. Of these, hydrazine derivatives having the structure shown by the following formula are preferred:

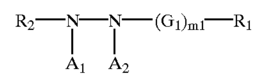

wherein $R_2$ represents an aliphatic group, an aromatic group, or a heterocyclic group; $R_1$ represents a hydrogen atom or a blocking group; $G_1$ represents a —CO—, —COCO—, —C=S—, —$SO_2$—, —SO—, or —$PO(R_3)$ group (in which $R_3$ is selected from a member defined for $R_1$ and $R_3$ and $R_1$ may be different from each other), or an iminomethylene group; $A_1$ and $A_2$ each represent a hydrogen atom, or one of them is a hydrogen atom, and the other is a substituted or unsubstituted alkylsulfonyl group, a substituted or unsubstituted arylsulfonyl group, or a substituted or unsubstitited acyl group; $m_1$ is 0 or 1, and when $m_1$ is 0, $R_1$ represents an aliphatic group, an aromatic group, or a heterocyclic group.

Further, it is also preferred to use a sensitizing dye, such as a cyanine dye, a merocyanine dye, a complex cyanine dye, a complex merocyanine dye, a holopolar cyanine dye, a styryl dye, a hemicyanine dye, an oxonol dye, and a hemioxonol dye.

An antifogging agent can be used; examples include a thiazonium salt as described in, for example, U.S. Pat. No. 2,694,716; azaindenes as described in, for example, U.S. Pat. No. 2,444,605; urazoles as described in, for example, U.S. Pat. No. 3,287,135; a mercury salt as described in, for example, U.S. Pat. No. 2,728,663; and an organic halogen compound as described in, for example, JP-A-6-208191, JP-A-7-5621, JP-A-8-15809, and U.S. Pat. No. 5,464,773.

Mercapto compounds, disulfide compounds, and thion compounds are preferably used for inhibition of development.

A reducing agent is preferably added to a light-sensitive layer. Examples of the reducing agent are described in, for example, JP-B-54-20333, JP-B-49-10727, JP-A-4-56848, JP-A-61-183642, JP-A-54-156525, JP-A-53-1020, JP-A-52-14788, JP-A-51-3223, JP-A-50-67132, and U.S. Pat. Nos. 4,510,236, 4,123,282, 3,782,941, and 3,080,254.

A dye or a pigment for antihalation are also preferably incorporated in a light-sensitive layer. Examples of them include a pyrazoloazole dye, an anthraquinone dye, an azo dye, an azomethine dye, an oxonol dye, a carbocyanine dye, a styryl dye, a triphenylmethane dye, an indoaniline dye, an indophenol dye, and phthalocyanine. These compounds may be added to a light-sensitive layer and/or a backing layer.

The total thickness of these light-sensitive layers is generally from 5 $\mu$m to 25 $\mu$m, and preferably from 8 $\mu$m to 20 $\mu$m.

The method of measurement for use in the present invention is described below.

(1) In-plane Rate of Dimensional Change at 60° C., 80% RH for 72 hours

Samples of width 5 cm and length 25 cm are cut out of a film at every angle of 10 degrees from the direction parallel to the transverse direction (TD) until 180 degrees (when a longer side of the sample is parallel to the TD, the angle is defined as being zero). These samples are subjected to air conditioning under the conditions of 25° C., 60% RH for 12 hours. After that, two holes, at intervals of 20 cm, are perforated, and the distance between pins is measured using a pin gauge (the length is defined as $L_1$). Thereafter, they are allowed to stand for 72 hours in an air thermostat of 60° C., 80% RH (Relative Humidity) with no tension. After that, the samples are subjected to air conditioning under the conditions of 25° C., 60% RH for 12 hours, and then the distance between the pins is again measured using the pin gauge (the length is defined as $L_2$).

The thermal rate of dimensional change is obtained based on the following equation:

In-plane rate of dimensional change (%) at 60° C., 80% RH$=\{100\times(L_1-L_2)/L_1\}$ This measurement is carried out with respect to each of the samples sampled at every angle of 10 degrees. This value is designated as the in-plane rate of dimensional change. The average value of the values is designated as the in-plane rate of dimensional change. The absolute value of the difference between the highest value and the lowest value of the in-plane rate of dimensional change is designated as the in-plane anisotropy.

Further, a measurement is carried out at both edge portions and the center portion of the base according to this method, to thereby obtain a distribution of in-plane rate of dimensional change in the base transverse direction.

(2) In-plane Rate of Dimensional Change at 105° C., 30 Minutes

Samples of width 5 cm and length 25 cm are cut out of a film at every angle of 10 degrees from the direction parallel to the transverse direction (TD) until 180 degrees (when a longer side of the sample is parallel to the TD, the angle is defined as being zero). These samples are subjected to air conditioning under the conditions of 25° C., 60% RH for 12 hours. After that, two holes, at intervals of 20 cm, are perforated, and the distance between pins is measured using a pin gauge (the length is defined as $l_1$). Thereafter, they are allowed to stand for 30 min in an air thermostat of 105° C. with no tension. After that, the samples are subjected to air conditioning under the conditions of 25° C., 60% RH for 12 hours, and then the distance between the pins is again measured using the pin gauge (the length is defined as $l_2$).

The thermal rate of dimensional change is obtained based on the following equation:

In-plane rate of dimensional change (%) at 105° C. for 30 minutes$=\{100\times(l_1-l_2)/l_1\}$ This measurement is carried out with respect to each of the samples sampled at every angle of 10 degrees. This value is designated as the in-plane rate of dimensional change. The average value of the values is designated as the in-plane rate of dimensional change. The absolute value of the difference between the highest value and the lowest value of the in-plane rate of dimensional change is designated as the in-plane anisotropy.

Further, a measurement is carried out at both edge portions and the center portion of the base according to this method, to thereby obtain the distribution of the in-plane rate of dimensional change in the base transverse direction.

In the present invention, differing from the conventional isotropic support described in the above, a support having the anisopropy when kept at 60° C., 80% RH for 72 hours, as specified in the invention, unexpectedly, shows an excellent thermal dimensional stability when kept at 105° C. for 30 minutes (when subjected to heat development).

The polyester film support of the present invention is excellent in thermal dimensional stability, and it is excellent in flatness when heated at a high temperature. A heat-development, photographic light-sensitive material using the polyester film is excellent in thermal dimensional stability. Further, the planar stability of the photographic material after heat development is so high that both distortion of the image and the occurrence of color discrepancies between each of colors of 4 printings can be prevented.

The present invention will be described in more detail with reference to the following Examples, but the invention should not be construed as being limited thereto.

EXAMPLE

Example 1

(1) Preparation of Support (1-1) Preparation of a Polyethylene Terephthalate (PET) Support A PET of IV=0.66 (measured at 25° C. in phenol/tetrachloroethane=6/4 (weight ratio)) was obtained using terephthalic acid and ethylene glycol, according to an ordinary method. Using a DSC and 10 mg of a sample of the PET, measurement was performed in a stream of nitrogen, raising the temperature at a rate of 20° C./minute. Consequently, the sample had a Tg of 70° C. and a Tm of 255° C. Pellets of the PET were prepared, and then they were dried at 130° C. for 4 hours, melted at 300° C., extruded from a T-die, and then rapidly cooled, to prepare an unstretched film, so that the unstretched film had a thickness of 120 $\mu$m after thermal fixation.

To the unstretched film, lengthwise stretching, relaxation thereafter, horizontal stretching, relaxation thereafter, thermal fixation, relaxation thereafter, and low-tension winding were performed, in this order, under the conditions shown in Table 1. In this performance, each of the levels of the present invention was heated during the thermal fixation, so that the temperature at both edges (chuck portions) was higher by 5° C. than that of the center portion. Further, when the temperature of the base that had been subjected to relaxation after the thermal fixation went down to 90° C., the edge (ear) portions that were fixed with chucks were trimmed, and then knurling processing (1 cm in width and 20 μm in height) was carried out on both edges of the base, followed by winding. The width of the thus-obtained support was 1.5 m.

(1-2) Preparation of a Polyethylene-2,6-naphthalate (PEN) Support

A PEN of IV=0.58 (measured at 25° C. in phenol/tetrachloroethane=6/4 (weight ratio)) was obtained using dimethyl naphthalene-2,6-dicarboxylate and ethylene glycol, according to an ordinary method. Using a DSC and 10 mg of a sample of the PEN, measurement was performed in a stream of nitrogen, raising the temperature at a rate of 20° C./minute. Consequently, the sample had a Tg of 120° C. and a Tm of 265° C. Pellets of the PEN were prepared, and then they were dried at 150° C. for 4 hours, melted at 320° C., extruded from a T-die, and then rapidly cooled, to prepare an unstretched film, so that the unstretched film had a thickness of 120 μm after thermal fixation.

To the unstretched film, lengthwise stretching, low-tension conveyance (lengthwise relaxation), horizontal stretching, relaxation thereafter, thermal fixation, relaxation thereafter, and low-tension winding were performed, in this order, under the conditions shown in Table 1. In this performance, each of the levels of the present invention was heated during the thermal fixation, so that the temperature at both edges (chuck portions) was higher by 5° C. than that of the center portion. Further, when the temperature of the base that had been subjected to relaxation after the thermal fixation went down to 90° C., the edge (ear) portions that were fixed with chucks were trimmed, and then knurling processing (1 cm in width and 20 μm in height) was carried out on both edges of the base, followed by winding. The width of the thus-obtained support was 1.5 m.

(2) Preparation of a Subbing Layer and a Backing Layer

To the above support having width of 1.5 m, the following subbing layers and backing layers were provided as shown in Table 1.

(2-1) Corona Discharge Treatment

Prior to coating, corona discharging (using a solid state corona discharging machine, Model 6 KVA, trade name, manufactured by Piller Co., both surfaces of a support were treated under room temperature at 20 meters/minute) was applied to both surfaces of the support to be coated. From the read values of the electric current and the voltage in this case, it was confirmed that treatment of 0.375 kV·A·minute/$m^2$ was applied to the support. In this case, the treating frequency was 9.6 kHz, and the gap clearance between the electrode and the dielectric roll was 1.6 mm. Then, the following layer was coated thereon.

(2-2) Subbing First Layer

A water-dispersed latex having the following composition was coated on the support, using a wire bar, at a dry thickness of 0.3 μm, followed by drying at 120° C. for 2 minutes.

| | |
|---|---|
| Butadiene-styrene copolymer latex (solid component 43%, butadiene/styrene (weight ratio) = 32/68) | 13 ml |
| 2,4-Dichloro-6-hydroxy-s-triazine sodium salt 8% aqueous solution | 7 ml |
| Sodium laurylbenzenesulfonate 1% aqueous solution | 1.6 ml |
| Distilled water | 80 ml |

(2-3) Subbing Second Layer

An aqueous solution having the following composition was coated on the subbing first layer, using a wire bar, at a dry thickness of 0.14 μm, followed by drying at 120° C. for 2 minutes.

| | |
|---|---|
| Gelatin | 0.9 g |
| Methylcellulose (Metolose SM15, trade name, of a substitution degree 1.79 to 1.83) | 0.1 g |
| Acetic acid (concentration 99%) | 0.02 ml |
| Distilled water | 99 ml |

(2-4) Backing First Layer (Electrically Conductive Layer)

An acrylic latex water-dispersed liquid of the following composition containing an electrically conductive material

TABLE 1

Conditions for film formation

| | | Lengthwise stretching | | Relaxation after lengthwise stretching | | Horizontal stretching | | Relaxation after horizontal stretching | | Thermal fixation | Relaxation rate[a] after | Low- |
|---|---|---|---|---|---|---|---|---|---|---|---|---|
| | Base material | Temperature ° C. | Folds | Temperature ° C. | Tension g/mm² | Temperature ° C. | Folds | Temperature ° C. | Relaxation rate[a] % | temperature ° C. | thermal fixation % | tension winding g/mm² |
| This invention 1 | PET | 100 | 3.2 | 115 | 30 | 115 | 3.7 | 155 | −4.0 | 235 | −4.0 | 60 |
| This invention 2 | PET | 90 | 3.6 | 95 | 80 | 100 | 3.9 | 140 | −3.0 | 220 | −3.0 | 85 |
| This invention 3 | PET | 115 | 2.9 | 150 | 10 | 130 | 3.3 | 170 | −8.0 | 225 | −7.0 | 10 |
| This invention 4 | PET | 105 | 3.0 | 110 | 50 | 120 | 3.7 | 150 | −3.5 | 245 | −3.5 | 30 |
| This invention 5 | PET | 100 | 3.6 | 115 | 30 | 120 | 3.6 | 155 | −4.0 | 215 | −4.0 | 30 |
| This invention 6 | PET | 140 | 2.8 | 155 | 60 | 150 | 3.8 | 190 | −4.5 | 250 | −4.5 | 50 |
| Comparative example 1 | PET | 100 | 3.6 | — | — | 135 | 3.6 | — | — | 215 | +15 | 30 |
| Comparative example 2 | PET | 100 | 3.6 | — | — | 100<br>200 | 1.8 ×<br>2.0[b] | — | — | 215 | +5 | 30 |

Note:
[a]Relaxation rate: "—" designates a shrinkage direction, and "+" designates an extension direction.
[b]Horizontal stretching in Comparative example 2 was carried out with a two-stage stretching: that is, after the stretching to 1.8 folds at 100.0° C., the base was stretched to 2.0 folds at 200° C.

was coated on the support surface opposite to the subbing surface, at a dry thickness that would become 0.04 μm, and dried at 180° C. for 30 seconds, to prepare a support having a surface electric resistance of $10^6$ Ω.

Acrylic resin aqueous dispersion (Jurymer ET410, trade name, solid content 20 wt. %, made by Nihon Junyaku K.K.) 2.0 wt. parts Tin oxide-antimony oxide aqueous dispersion (average particle size 0.1 μm, 17 wt. %) 18.1 wt. parts Polyoxyethylene phenyl ether 0.1 wt. parts To the above mixture, distilled water was added to make 100 wt parts in total.

(2-5) Backing Second Layer (Color-forming Layer)

A coating solution having the following composition was coated on the first backing layer, so as to be 0.7 in optical density at 660 nm of coated and dried film.

Preparation of a Color-forming Agent Dispersion A 2.5 g of the following Compound 1 and 1 g of crosslinking PMMA fine particles having an average particle size of 5 μm, were added to 35 g of ethyl acetate, and then the contents were mixed. 50 g of a 10 wt % solution of polyvinyl alcohol previously dissolved, was added to the resultant solution, and then the contents were dispersed by a homogenizer for 5 minutes. Thereafter, ethyl acetate was removed from the dispersion by a conventional solvent-removing method, and then the dispersion was diluted with water, to prepare the color-forming agent dispersion.

Compound 1

$H_3C$ $N$ $CH_3$ $H_3C$ $N$ $H_3C$ COOH $N$ $C_2H_5$ $C_2H_5$ (2-6) Backing Third Layer (Polyolefin Layer: Slippery Layer)

A polyolefin latex water-dispersed liquid of the following composition was coated on the color-forming layers, at a dry thickness that would become 0.15 μm. Then, the obtained material was dried at 185° C. for 3 minutes, under the tension of 8 kg per 1 m-width.

Polyolefin (Chemipearl S-120, 27 wt. %, trade name, made by Mitsui Petrochemical Industries, Ltd.) 3.0 wt. parts Colloidal silica (Snow Tex C, trade name, made by Nissan Chemical Industries, Ltd.) 2.0 wt. parts Epoxy compound (Denacol EX-614B, trade name, made by Nagase Kasei K.K.) 0.3 wt. parts To the above solution, distilled water was added to make 100 wt. parts in total.

(3) Heat Treatment

A heat treatment was applied to the above support that was provided subbing layers and backing layers, having the width of 1.5 m, under the condition shown in Table 2.

TABLE 2

| | Conditions for heat treatment | | | | | | |
|---|---|---|---|---|---|---|---|
| | Pre-heating | | Heat treatment | | | Annealing | |
| | Temperature ° C. | Time sec | Temperature ° C. | Time sec | Tension kg/cm$^2$ | Tempera ture ° C. | Time sec |
| This invention 1 | 90 | 40 | 155 | 80 | 1.5 | 95 | 35 |
| This invention 2 | 75 | 10 | 145 | 35 | 3.3 | 80 | 20 |
| This invention 3 | 160 | 110 | 180 | 180 | 0.7 | 150 | 115 |
| This invention 4 | 85 | 60 | 160 | 60 | 1.0 | 85 | 70 |
| This invention 5 | 80 | 50 | 145 | 45 | 1.5 | 80 | 50 |
| This invention 6 | 145 | 20 | 170 | 120 | 2.0 | 135 | 30 |
| Comparative example 1 | — | — | 140 | 5 | 5.0 | — | — |
| Comparative example 2 | — | — | 140 | 2 | 5.0 | — | — |

(4) Evaluation of the Polyester Support

With respect to the polyester supports that had been subjected to heat treatment, the in-plane rate of dimensional change of each was measured according to the above-described method. The results thus obtained are shown in Table 3. Further, the flatness (planar property) thereof was evaluated according to the following method. The thus-obtained results are also shown in Table 3.

(4-1) Height of Undulation

The height of undulation that occurs in the lengthwise direction of the support was measured according to the following method. The flatness at the center portion of the support is evaluated by the results.

[1] A center portion of the heat-treated support is cut to the size of 50 cm in transverse direction and 30 cm in longitudinal direction.

[2] This fragment is floated on the surface of water, without bubbles between the fragment and the water surface, and then the surface thereof is scanned by a laser focus displacement meter (for example, Type LC2210, manufactured by Keyence Co.), along the transverse direction at 50 cm/minute.

[3] The highest value—the lowest value obtained in the above (excluding both ends of the film) is defined as the height of undulation of the support.

(4-2) Height of Edge (Ear) Extension

The height of slackening that occurred at both ends of the base was measured according to the following method.

[1] A support is gently placed on a horizontal, flat table.

[2] The height of the support that rises from the table is measured using a slide calipers, over the length of 1 m at both ends. The highest value of the height is defined as the height of edge extension.

(4-3) Dimples

The number of dimples (depressed cavities) of diameter 10 to 50 cm that occurred in the base was counted according to the following method.

[1] A sample having the full width and 3 m in the MD direction is cut out of the base. This sample is placed on a horizontal, flat table.

[2] An image of fluorescent lamps is reflected on the surface of the support. The number of places (depression) where the fluorescent lamps look distorted in the cratering-state is counted. The number divided by the measurement area is defined as the number of dimples.

TABLE 3

Results of evaluation of polyester supports

| | Dimensional stability | | | | | | | | | | | |
|---|---|---|---|---|---|---|---|---|---|---|---|---|
| | 60° C. 80% rh 72 hrs | | | | | | 105° C. 30 min | | | | | |
| | In-plane rate of dimensional change*) | | | In-plane anisotropy | | | Average of in-plane rate of dimensional change | | | In-plane anisotropy | | |
| | Edge in TD % | Center in TD % | Edge in TD % | Edge in TD % | Center in TD % | Edge in TD % | Edge in TD % | Center in TD % | Edge in TD % | Edge in TD % | Center in TD % | Edge in TD % |
| This invention 1 | 0.040 | 0.038 | 0.041 | 0.012 | 0.008 | 0.011 | −0.004 | −0.003 | −0.005 | 0.002 | 0.001 | 0.003 |
| | 0.028 | 0.031 | 0.030 | | | | | | | | | |
| This invention 2 | 0.048 | 0.043 | 0.049 | 0.026 | 0.023 | 0.029 | −0.065 | −0.057 | −0.068 | 0.076 | 0.061 | 0.070 |
| | 0.022 | 0.020 | 0.020 | | | | | | | | | |
| This invention 3 | 0.024 | 0.022 | 0.025 | 0.002 | 0.000 | 0.004 | −0.001 | 0.000 | 0.003 | 0.001 | 0.000 | 0.001 |
| | 0.022 | 0.022 | 0.021 | | | | | | | | | |
| This invention 4 | 0.035 | 0.030 | 0.033 | 0.007 | 0.005 | 0.006 | −0.015 | −0.010 | −0.005 | 0.018 | 0.010 | 0.011 |
| | 0.028 | 0.025 | 0.027 | | | | | | | | | |
| This invention 5 | 0.023 | 0.022 | 0.025 | 0.002 | 0.002 | 0.003 | −0.035 | −0.028 | −0.040 | −0.031 | −0.035 | −0.033 |
| | 0.021 | 0.020 | 0.022 | | | | | | | | | |
| This invention 6 | 0.031 | 0.027 | 0.030 | 0.007 | 0.005 | 0.005 | −0.012 | −0.005 | −0.015 | 0.028 | 0.020 | 0.024 |
| | 0.024 | 0.022 | 0.025 | | | | | | | | | |
| Comparative example 1 | 0.009 | 0.007 | 0.008 | 0.003 | 0.003 | 0.003 | 0.195 | 0.170 | 0.185 | 0.170 | 0.145 | 0.165 |
| | 0.006 | 0.004 | 0.005 | | | | | | | | | |
| Comparative example 1 | 0.018 | 0.016 | 0.017 | 0.011 | 0.008 | 0.008 | 0.056 | 0.039 | 0.047 | 0.039 | 0.025 | 0.033 |
| | 0.007 | 0.008 | 0.009 | | | | | | | | | |

| | Flatness after heat treatment | | |
|---|---|---|---|
| | Height of undulation μm | Height of edge extension mm | Dimples number/m² |
| This invention 1 | 20 | 0.1 | 0 |
| This invention 2 | 110 | 0.4 | 1 |
| This invention 3 | 10 | 0 | 0 |
| This invention 4 | 40 | 0.3 | 0 |
| This invention 5 | 70 | 0.5 | 0 |
| This invention 6 | 30 | 0.5 | 0 |
| Comparative example 1 | 450 | 2.5 | 8 |
| Comparative example 2 | 330 | 1.3 | 4 |

Note: *)upper column; the highest value, lower column; the lowest value (5) Preparation of a Light-Sensitive Material The following styrene-butadiene rubber latex (SBR)-series light-sensitive layer, or polyvinylbutyral (PVB)-series light-sensitive layer, was coated as shown in Table 4, on the subbing layer-coating side of the support of width of 1.5 m, which support has been coated the above-described subbing layers and backing layers, followed by heat treatment.

(5-1) SBR-series Light-sensitive Layer

Preparation of Silver Halide Grains A 22 g of a phthalated gelatin and 30 mg of potassium bromide were dissolved in 700 ml of water. After adjustment of the pH to 5.0 at 40° C., 159 ml of an aqueous solution containing 18.6 g of silver nitrate, and an aqueous solution containing potassium bromide were added to the resulting solution, over 10 minutes, according to the controlled double jet method, with the pAg kept to be 7.7. Further, an aqueous solution containing $8\times10^{-6}$ mol/l of $K_3[IrCl_6]^{3-}$ and 1 mol/l of potassium bromide was added thereto, over 30 minutes, according to the controlled double jet method, with the pAg kept to be 7.7. Thereafter, the pH and the pAg were adjusted to 5.9 and 8.0, respectively.

The thus-obtained silver halide grains were cubic grains having an average grain size of 0.07 μm, a deviation coefficient of a diameter of a projected area of 8%, and a (100) area ratio of 86%.

The above-described silver halide grains C were warmed to the temperature of 60° C. To the warmed grains, were added $8.5\times10^{-5}$ mol of sodium thiosulfate, $1.1\times10^{-5}$ mol of 2,3,4,5,6-pentafluorophenyldiphenylsulfinselenide, $2\times10^{-6}$ mol of the tellurium compound-1, $3.3\times10^{-6}$ mol of chloroauric acid, and $2.3\times10^{-4}$ mol of thiocyanic acid, per mol of silver, respectively, and then the resultant mixture was allowed to ripen for 120 minutes. Thereafter, $8\times10^{-4}$ mol of the sensitizing dye-C was added to the mixture, with stirring, after the temperature was cooled to 50° C., followed by addition of $3.5\times10^{-2}$ mol of potassium iodide. After the resultant mixture was stirred for 30 minutes, it was rapidly cooled to 30° C., to finish preparation of the silver halide.

Sensitizing dye C

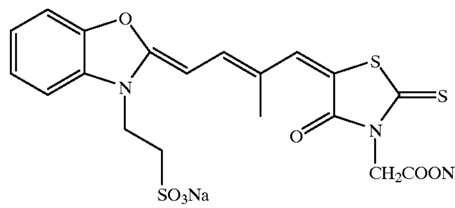

Tellurium compound 1

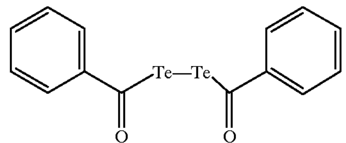

Preparation of a Dispersion of Fine Crystals of a Silver Salt of an Organic Acid 40 g of behenic acid, 7.3 g of stearic acid, and 500 ml of a distilled water were mixed at 90° C. for 15 minutes. 187 ml of a 1N-NaOH aqueous solution was added to the mixture, with vigorous stirring, over 15 minutes, followed by 61 ml of a 1N-nitric acid aqueous solution, and then cooling to 50° C. Thereafter, 124 ml of a 1N-nitric acid aqueous solution was added to the resultant mixture, and they were stirred for 30 minutes. Thereafter, solid contents were separated by suction filtration, and then the separated solid contents were washed with water, until the conductivity of the filtrate became 30 μS/cm. The thus-obtained solid contents were used in the form of a wet cake without drying them. 12 g of polyvinyl alcohol and 150 ml of water were added to the wet cake, corresponding to 34.8 g of the dry solid contents, and they were mixed well, to obtain a slurry. 840 g of zirconia beads (average diameter, 0.5 mm) provided together with the slurry were placed in a vessel, and they were dispersed for 5 hours using a dispersing machine (1/4G-sand grinder mill, manufactured by IMEX Co., Ltd.), to obtain a dispersion of fine crystals of a silver salt of an organic acid having a volume weighted average size of 1.5 μm. Measurement of the average grain size was carried out using a Master Saizer X, trade name, manufactured by Malvern Instruments Ltd.

Preparation of a Dispersion of Solid Material Fine Particles

Dispersions of solid fine particles of any of tetrachlorophthalic acid, 4-methylphthalic acid, 1,1-bis(2-hydroxy-3,5-dimethylphenyl)-3,5,5-trimethylhexane, phthalazine, and tribromomethylsulfonylbenzene were prepared, respectively.

0.81 g of hydroxypropyl cellulose and 94.2 ml of water were added to tetrachlorophthalic acid. The resultant mixture was stirred well, to make a slurry, and the slurry was allowed to stand for 10 hours. Thereafter, the slurry and 100 ml of zirconia beads (average diameter, 0.5 mm) were placed in a vessel, and they were dispersed for five hours, using a dispersing machine of the same type used to prepare the dispersion of fine crystals of a silver salt of an organic acid, to obtain a dispersion of tetrachlorophthalic acid solid fine crystals. 70 wt % of the solid fine particles had a particle size of 1.0 μm.

Preparation of a Coating Solution for a Photographic Emulsion Layer

The following composition was added to the previously prepared dispersion of fine crystals of a silver salt of an organic acid, to prepare a coating solution for a photographic emulsion layer.

| | |
|---|---|
| Dispersion of fine crystals of a silver salt of an organic acid | 1 mol |
| Silver halide grains A | 0.05 mol |
| Binder, SBR latex (LACSTAR 3307B, trade name, manufactured by Dainippon Ink and Chemicals, Incorporated) | 430 g |
| Material for Development: | |
| Tetrachlorophthalic acid | 5 g |
| 1,1-Bis(2-hydroxy-3,5-dimethylphenyl)-3,5,5-trimethylhexane | 98 g |
| Phthalazine | 9.2 g |
| Tribromomethylphenol sulfone | 12 g |
| 4-Methylphtharic acid | 7 g |
| Hydrazine nucleating agent | $5.0\times10^{-3}$ mol/Ag 1 mol |
| (Preparation of a coating solution for an emulsion-protective layer) | |

The following composition was added to an inert gelatin, to prepare a coating solution for the emulsion-protective layer.

| | |
|---|---|
| Inert gelatin | 10 g |
| Surfactant A | 0.26 g |
| Surfactant B | 0.09 g |
| Matting agent (PMMA having av. grain diameter of 3 μm) | 1 g |
| 1,2-(Bisvinylsulfoneacetamide)ethane | 0.3 g |
| Water | 64 g |

Hydrazine nucleating agent

HD1

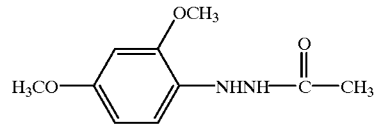

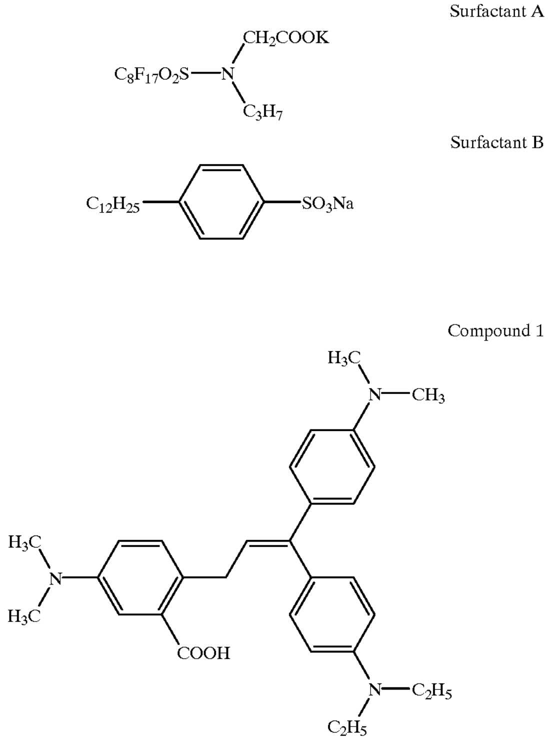

(5-2) PVB-series Light-Sensitive Layer

Preparation of Silver Organate Emulsion B 840 g of behenic acid and 95 g of stearic acid were added to 12 liters of water, and then an aqueous solution, in which sodium hydroxide (48 g) and sodium carbonate (63 g) had been dissolved in water (1.5 liters), was added to the mixture, with the temperature maintained at 90° C. The content was stirred for 30 minutes and then cooled to 50° C. Thereafter, 1.1 liters of a 1% aqueous solution of N-bromosuccinimide was added to the mixture, and subsequently 2.3 liters of a 17% aqueous solution of silver nitrate was gradually added thereto, with stirring. Further, the content was cooled to 35° C. 1.5 liters of a 2% aqueous solution of potassium bromide was added, over two minutes, with stirring. After stirring was continued for an additional 30 minutes, 2.4 liters of a 1% aqueous solution of N-bromosuccinimide was added to the mixture. To the aqueous mixture, 330 g of a 1.2 weight % butyl acetate solution of polyvinyl acetate was added, with stirring, and then the content was allowed to stand for 10 minutes, to separate two layers. The aqueous layer was removed from the content, and the residual gel was washed with water twice. The thus-obtained gelled mixture of silver behenate/stearate and silver bromide was dispersed with 1800 g of a 2.6% 2-butanone solution of polyvinl buthyral (Denkabutyral # 3000-K, trade name, manufactured by Denki Kagaku Kogyo Kabushiki Kaisha), and further the resultant mixture was dispersed with 600 g of polyvinylbutyral (Denkabutyral # 4000-2, trade name, manufactured by Denki Kagaku Kogyo Kabushiki Kaisha) and 300 g of isopropylalcohol, to obtain a silver organic acid salt emulsion (needle-like grains having an average minor axis of 0.05 $\mu$m, an average major of axis 1.2 $\mu$m, and a coefficient of fluctuation of 25%).

Preparation of Coating Solution B for Photographic Emulsion Layer

To the thus-obtained silver organic acid salt emulsion, chemicals were added, such that the amounts of these chemicals each became those as described below, per mol of silver. That is, 10 mg of sodium phenylthiosulfonate, 40 mg of the sensitizing dye A, 8 mg of the sensitizing dye B, 2 g of 2-mercapto-5-methylbenzimidazole (C-1), 1 g of 2-mercapto-5-methylbenzothiazole (C-2), 21.5 g of 4-chlorobenzophenone-2-carboxylic acid (C-3), 580 g of 2-butanone, and 220 g of dimethylformamide were added thereto, at 25° C., with stirring, and then the content was allowed to stand for 3 hours. Thereafter, to the resultant emulsion, 4.5 g of 4,6-ditrichloromethyl-2-phenyltriazine (C-4), 2 g of the disulfide compound A, 160 g of 1,1-bis(2-hydroxy-3,5-dimethylphenyl)-3,5,5-trimethylhexane (C-5), 15 g of phthalazine (C-6), 5 g of teterachlorophthalic acid (C-7), $9.0\times10^{-3}$ mol of hydrazine nucleating agent HD3 per mol of Ag, 1.1 g of Magefac F-176P (a fluorosurfactant, trade name, manufactured by Dainippon Ink & Chemicals Incorporated), 590 g of 2-butanone, and 10 g of methylisobutylketone were added, with stirring.

Preparation of Coating Solution B for an Emulsion-Protecting Layer

A mixed solution of 75 g of CAB 171-15S (cellulose acetate/butyrate, trade name, manufactured by Eastman Chemicals Co., Ltd.), 5.7 g of 4-methylphthalic acid (C-8), 1.5 g of tetrachlorophthalic acid (C-9), 10 g of 2-tribromomethylsulfonylbenzothiazole (C-10), 2 g of phthalazone (C-11), 0.3 g of Magefac F-176P (trade name, the same to the above), 1 g of a PMMA matting agent having the average particle size of 3 $\mu$m, and 5 g of sumidur N3500 (polyisocyanate, trade name, manufactured by Sumitomo Byer Urethane Co., Ltd.), dissolved in 3070 g of 2-butanone and 30 g of ethylacetate, was prepared.

The thus-obtained coating solution for the photographic emulsion layer was applied to a support in a coating amount of 2 g/m$^2$ in terms of silver. Thereafter, the coating solution for the emulsion-protecting layer was further coated on the surface of the above-described emulsion layer, such that the layer thickness after drying became 5 $\mu$m.

(C-1)

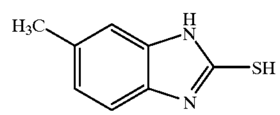

(C-2)

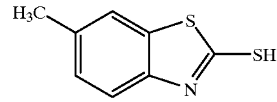

-continued
(C-3)
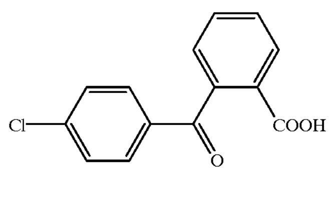
(C-4)
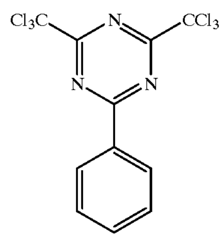
(C-5)
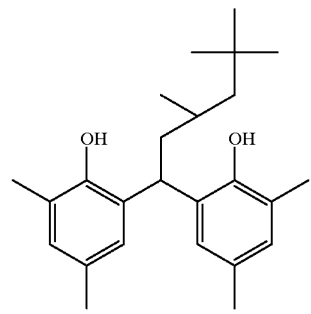
(C-6)
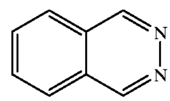
(C-7)
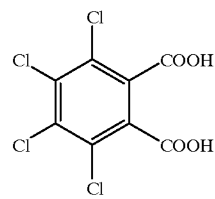
(C-8)
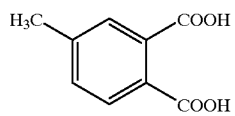
(C-9)
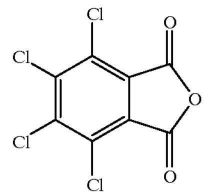
(C-10)
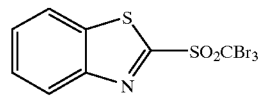
(C-11)
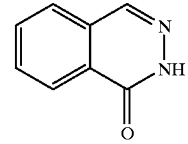
(C-12)
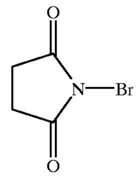
(C-13)
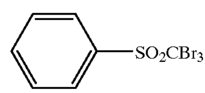
Disulfide compound A
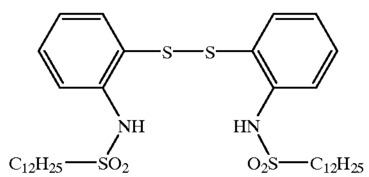

-continued

Hydrazine nucleating agent
HD3

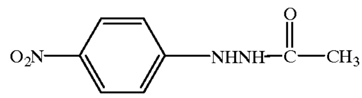

Sensitizing dye A

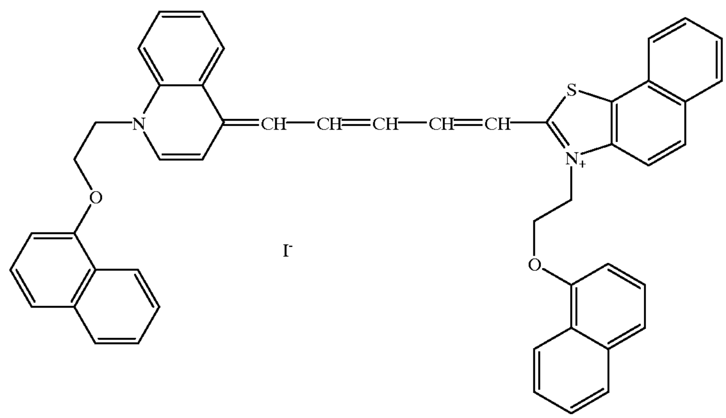

Sensitizing dye B

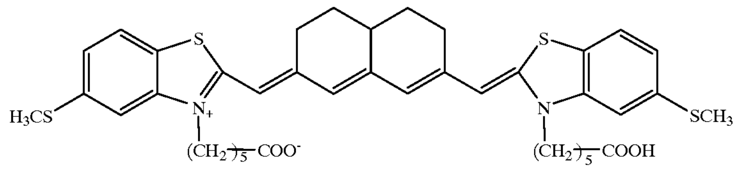

Dye A

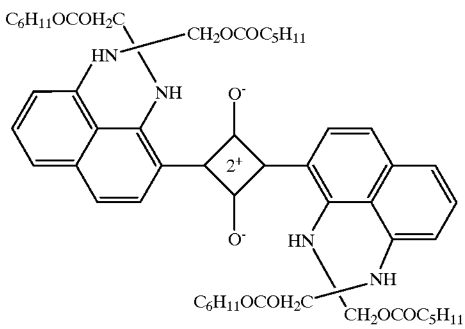

Dye B

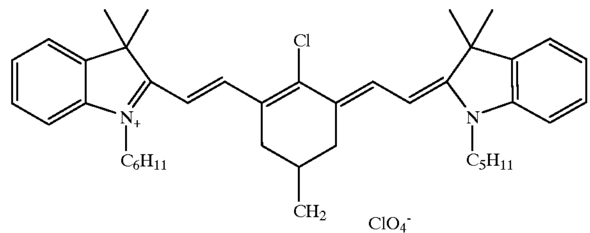

The in-plane rate of dimensional change and the flatness of the thus-prepared photographic light-sensitive materials before and after the heat development were each measured by the following methods. The results are shown in Table 4.

[1] Sampling: Samples of width 5 cm and length 25 cm are cut out of the photographic material at every angle of 10 degrees from the direction parallel to the transverse direction (TD) until 180 degrees (when a large side of the sample is parallel to the TD, the angle is defined as being zero).

[2] Humidification and Measurement of Length: After humidifying each sample sampled in the above at 25° C. and 60% RH for 12 hours, 2 holes, at intervals of 20 cm, are perforated, and the interval of the 2 holes is measured using a pin gauge (the length is defined as $L_1$).

[3] Heat Development: The above-described sample is placed for 30 seconds on a stainless plate of 10 mm thickness and heated to the temperature shown in Table 4 (measurement in-plane temperature distribution ±1.5° C. or less). At this time, the sample is lightly pressed from above, such that the whole surface of the sample comes in contact with the stainless plate.

[4] Humidification and Measurement of Length: After humidifying each of the above sample at 25° C. and 60% RH for 12 hours, the interval of the 2 holes is again measured using a pin gauge (the length is defined as $L_2$). The thermal rate of dimensional change is obtained based on the following equation.

$$\text{In-plane rate of dimensional change (\%) at } 60° \text{ C. and } 80\% \text{ RH} = \{100 \times (L_1 - L_2)/L_1\}$$

This measurement is carried out for the samples cut out of the photographic material at every 10 degrees. This value is designated as the in-plane rate of dimensional change. The average value of this is designated as the in-plane rate of dimensional change. The absolute value of the difference between the highest value and the lowest value of the in-plane rate of dimensional change is designated as the in-plane anisotropy.

Further, the flatness of a sample cut to size 60 cm×60 cm, followed by heat development according to the above-described method, was evaluated by the above-described method. The results are shown in Table 4.

otherwise specified, but rather be construed broadly within its spirit and scope as set out in the accompanying claims.

What I claim is:

1. A polyester film, which has the in-plane rate of dimensional change of more than 0.02%, but not more than 0.05%, when the film is kept for 72 hours under the conditions of temperature 60° C. and relative humidity 80%, and the average value of the in-plane rate of dimensional change of from −0.07% to 0.03% and the in-plane anisotropy of the in-plane rate of dimensional change of from 0% to 0.08%, when the film is kept for 30 minutes at a temperature of 105° C.

2. The polyester film as claimed in claim 1, wherein, when the film is kept for 72 hours under the conditions of temperature 60° C. and relative humidity 80%, the in-plane anisotropy of the in-plane rate of dimensional change is from 0% to 0.04%.

3. The polyester film as claimed in claim 1, wherein, with respect to the whole region in the base transverse direction, when the film is kept for 72 hours under the conditions of temperature 60° C. and relative humidity 80%, the in-plane rate of dimensional change is more than 0.02%, but not more than 0.05% and the in-plane anisotropy of the in-plane rate of dimensional change is from 0% to 0.04%, and, with respect to the whole region in the base transverse direction, when the film is kept for 30 minutes at a temperature of 105° C., the average value of the in-plane rate of dimensional change is from −0.07% to 0.03% and the in-plane anisotropy of the in-plane rate of dimensional change is from 0% to 0.08%.

TABLE 4

| | | | Results of evaluation after coating for light-sensitive materials | | | | | | | | |
|---|---|---|---|---|---|---|---|---|---|---|---|
| | | | Dimensional stability before and after heat development | | | | | | | | |
| | | | Average of in-plane rate of dimensional change | | | In-plane anisotropy | | | Flatness after heat treatment | | |
| | Light-sensitive layer | Conditions for heat development | Edge in TD % | Center in TD % | Edge in TD % | Edge in TD % | Center in TD % | Edge in TD % | Height of undulation μm | Height of edge extension mm | Dimples number/m$^2$ |
| This invention 1 | SBR | 115° C. 30 sec | −0.001 | 0.000 | −0.001 | 0.002 | 0.000 | 0.001 | 20 | 0.1 | 0 |
| | | 105° C. 30 sec | −0.000 | 0.000 | −0.001 | 0.002 | 0.001 | 0.000 | 20 | 0.1 | 0 |
| This invention 2 | SBR | 115° C. 30 sec | −0.025 | −0.022 | −0.024 | 0.014 | 0.011 | 0.017 | 90 | 0.2 | 0 |
| | | 105° C. 30 sec | −0.023 | −0.020 | −0.022 | 0.012 | 0.009 | 0.016 | 85 | 0.2 | 0 |
| This invention 3 | SBR | 115° C. 30 sec | 0.002 | 0.010 | 0.006 | 0.002 | 0.003 | 0.005 | 140 | 0.7 | 1 |
| | | 105° C. 30 sec | 0.001 | 0.007 | 0.004 | 0.002 | 0.002 | 0.004 | 110 | 0.5 | 1 |
| This invention 4 | PVB | 115° C. 30 sec | −0.012 | −0.008 | −0.009 | 0.008 | 0.007 | 0.008 | 20 | 0.1 | 0 |
| | | 105° C. 30 sec | −0.009 | −0.006 | −0.007 | 0.007 | 0.007 | 0.008 | 20 | 0.0 | 0 |
| This invention 5 | SBR | 115° C. 30 sec | −0.020 | −0.018 | −0.016 | 0.017 | 0.014 | 0.015 | 50 | 0.3 | 0 |
| | | 105° C. 30 sec | −0.017 | −0.015 | −0.014 | 0.015 | 0.014 | 0.014 | 45 | 0.2 | 0 |
| This invention 6 | SBR | 115° C. 30 sec | −0.007 | 0.000 | −0.005 | 0.006 | 0.006 | 0.007 | 10 | 0.2 | 0 |
| | | 105° C. 30 sec | −0.006 | 0.001 | −0.004 | 0.005 | 0.005 | 0.006 | 10 | 0.2 | 0 |
| Comparative example 1 | SBR | 115° C. 30 sec | −0.188 | −0.164 | −0.172 | 0.125 | 0.108 | 0.122 | 590 | 3.3 | 14 |
| | | 105° C. 30 sec | −0.185 | −0.065 | −0.078 | 0.075 | 0.062 | 0.076 | 380 | 2.3 | 9 |
| Comparative example 1 | SBR | 115° C. 30 sec | −0.129 | −0.108 | −0.115 | 0.085 | 0.074 | 0.088 | 410 | 2.3 | 9 |
| | | 105° C. 30 sec | −0.063 | −0.059 | −0.062 | 0.053 | 0.048 | 0.055 | 290 | 1.9 | 6 |

As described above, according to the present invention, a polyester support and a photographic light-sensitive material using the same, each having an excellent in-plane rate of dimensional change and flatness, can be provided. This effect is particularly effective when the heat development temperature is high. Consequently, even if the temperature is raised up to 115° C., a good rate of dimensional change and flatness, similar to the results obtained at 105° C., can be attained.

Having described our invention as related to the present embodiments, it is our intention that the invention not be limited by any of the details of the description, unless

4. The polyester film as claimed in claim 1, wherein the polyester film is a polyethylene terephthalate film or a polyethylene naphthalate film.

5. The polyester film as claimed in claim 1, wherein the polyester film is a polyethylene terephthalate film.

6. The polyester film as claimed in claim 1, wherein the polyester film is a polyethylene naphthalate film.

7. The polyester film as claimed in claim 1, wherein the film is subjected to relaxation.

8. The polyester film as claimed in claim 1, which contains a silver salt of an organic acid in a light-sensitive layer.

9. The polyester film as claimed in claim 8, wherein the silver salt of an organic acid is silver behenate.

10. The polyester film as claimed in claim 1, which contains a nucleating agent.

11. The polyester film as claimed in claim 1, wherein the nucleating agent is a hydrazine derivative.

12. An anisotropic polyester film, which has the in-plane rate of dimensional change of more than 0.02%, but not more than 0.05% and the in-plane anisotropy of the in-plane rate of dimensional change of from 0.005% to 0.04%, when the film is kept for 72 hours under the conditions of temperature 60° C. and relative humidity 80%, and the average value of the in-plane rate of dimensional change of from −0.07% to 0.03% and the in-plane anisotropy of the in-plane rate of dimensional change of from 0.01% to 0.08%, when the film is kept for 30 minutes at a temperature of 105° C.

13. The anisotropic polyester film as claimed in claim 12, wherein, with respect to the whole region in the base transverse direction, when the film is kept for 72 hours under the conditions of temperature 60° C. and relative humidity 80%, the in-plane rate of dimensional change is more than 0.02%, but not more than 0.05% and the in-plane anisotropy of the in-plane rate of dimensional change is from 0.005% to 0.04%, and, with respect to the whole region in the base transverse direction, when the film is kept for 30 minutes at a temperature of 105° C., the average value of the in-plane rate of dimensional change is from −0.07% to 0.03% and the in-plane anisotropy of the in-plate rate of dimensional change is from 0.010% to 0.08%.

14. The anisotropic polyester film as claimed in claim 12, wherein the polyester film is a polyethylene terephthalate film or a polyethylene naphthalate film.

15. A heat-development photographic light-sensitive material, having a support which comprises a polyester film, wherein the polyester film has the in-plane rate of dimensional change of more than 0.02%, but not more than 0.05%, when the film is kept for 72 hours under the conditions of temperature 60° C. and relative humidity 80%, and the average value of the in-plane rate of dimensional change of from −0.07% to 0.03% and the in-plane anisotropy of the in-plane rate of dimensional change of from 0% to 0.08%, when the film is kept for 30 minutes at a temperature of 105° C.

16. The heat-development photographic light-sensitive material as claimed in claim 15, wherein, when the film is kept for 72 hours under the conditions of temperature 60° C. and relative humidity 80%, the in-plane anisotropy of the in-plane rate of dimensional change is from 0% to 0.04%.

17. The heat-development photographic light-sensitive material as claimed in claim 15, wherein, with respect to the whole region in the base transverse direction, when the film is kept for 72 hours under the conditions of temperature 60° C. and relative humidity 80%, the in-plane rate of dimensional change is more than 0.02%, but not more than 0.05% and the in-plane anisotropy of the in-plane rate of dimensional change is from 0% to 0.04%, and, with respect to the whole region in the base transverse direction, when the film is kept for 30 minutes at a temperature of 105° C., the average value of the in-plane rate of dimensional change is from −0.07% to 0.03% and the in-plane anisotropy of the in-plane rate of dimensional change is from 0% to 0.08%.

18. A heat-development photographic light-sensitive material, having a support which comprises an anisotropic polyester film, wherein the anisotropic polyester film has the in-plane rate of dimensional change of more than 0.02%, but not more than 0.05% and the in-plane anisotropy of the in-plane rate of dimensional change of from 0.005% to 0.04%, when the film is kept for 72 hours under the conditions of temperature 60° C. and relative humidity 80%, and the average value of the in-plane rate of dimensional change of from −0.07% to 0.03% and the in-plane anisotropy of the in-plane rate of dimensional change of from 0.01% to 0.08%, when the film is kept for 30 minutes at a temperature of 105° C.

19. The heat-development photographic light-sensitive material as claimed in claim 18, wherein, with respect to the whole region in the base transverse direction, when the film is kept for 72 hours under the conditions of temperature 60° C. and relative humidity 80%, the in-plane rate of dimensional change is more than 0.02%, but not more than 0.05% and the in-plane anisotropy of the in-plane rate of dimensional change is from 0.005% to 0.04%, and, with respect to the whole region in the base transverse direction, when the film is kept for 30 minutes at a temperature of 105° C., the average value of the in-plane rate of dimensional change is from −0.07% to 0.03% and the in-plane anisotropy of the in-plate rate of dimensional change is from 0.010% to 0.08%.

* * * * *